United States Patent Office 3,707,552
Patented Dec. 26, 1972

3,707,552
ESTERS OF THIOGLYCOLLIC AND MERCAPTO PROPIONIC ACID
Bryan Dobinson, Duxford, and Bernard Peter Stark, Stapleford, England, assignors to Ciba-Geigy AG
No Drawing. Filed June 10, 1970, Ser. No. 45,246
Claims priority, application Great Britain, June 18, 1969, 30,957/69
Int. Cl. C07c 149/22
U.S. Cl. 260—481 R     2 Claims

ABSTRACT OF THE DISCLOSURE

A polythiol of the formula

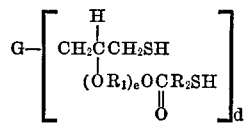

wherein G represents a radical obtained by removal of $d$ active hydrogen atoms from a compound having at least $d$ active hydrogen atoms, $R_1$ represents an alkylene group containing two or more carbon atoms, $R_2$ represents a divalent organic residue, $e$ is zero or a positive integer, and $d$ is an integer of at least 1 which are intermediates for the preparation of curing agents useful as sealants, caulking agents and cable jointing agents.

---

This invention relates to novel ester-ethers, to processes for their preparation, and to their uses in curable compositions.

Polymeric substances in which each molecule of the polymer contains two or more thiol mercaptan (—SH) groups are known (see, e.g. High Polymers, vol. XIII, Part III, Polyalkylene Sulphides and Other Polythioethers, ed. Gaylord, Interscience, 1962). Such polymers may be cured by so-called oxidative curing agents to give products which may be used as sealants and caulking agents. The polymers may also be cured with epoxy resins.

A type of polythiol which has recently become available is the poly(2-hydroxy-3-mercaptopropyl) ethers (see United Kingdom specifications No. 1,144,761 and No. 1,076,725, and U.S. Pat. No. 3,258,495). These ethers may be prepared by reaction of epichlorohydrin with a polyhydric alcohol to form a chlorohydrin, and treatment with sodium hydrogen sulphide to effect replacement of the chlorine atoms by thiol groups. They may also be obtained by treating polyglycidyl ethers with hydrogen sulphide (see United Kingdom specifications No. 1,085,935 and 1,031,-543).

A disadvantage of these products is that for certain applications, their thiol content per unit weight of substance is too low.

It has now been found that novel substances, having an increased thiol content, can be obtained by esterification with mercaptocarboxylic acids of 2-hydroxy-3-mercaptopropyl ethers and similar compounds.

Accordingly, the present invention provides novel polythiols of formula

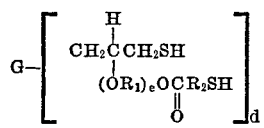

wherein

G represents a radical obtained by removal of $d$ active hydrogen atoms from a compound having at least $d$ active hydrogen atoms, $R_1$ represents an alkylene group containing two or more carbon atoms, $R_2$ represents a divalent organic residue, $e$ is zero or a positive integer, and $d$ is an integer of at least 1.

The radical G may be derived by removal of $d$ hydrogen atoms from the hydroxyl groups of an alcohol or a phenol containing at least $d$ alcoholic and/or phenolic hydroxyl groups, e.g. from monohydric or polyhydric alcohols such as methanol, ethanol, 2-ethoxyethanol, 1-octanol, ethylene glycol, propylene glycol, propane-1,3-diol, butane-1,2-diol, butane-1,3-diol, butane-1,4-diol, butane-2,3-diol, glycerol, 1,1,1-trimethylolethane, 1,1,1-trimethylolpropane, hexane - 1,2,5-triol, hexane-1,2,6-triol, pentaerythritol, mannitol, sorbitol quinitol, resorcitol, bis(4-hydroxycyclohexyl)methane, 2,2-bis(4-hydroxycyclohexyl)propane, 2,2-bis(p-(hydroxypropoxy)phenyl)propane, and particularly from hydroxyl-terminated polyethers and polyether-polyesters such as poly(oxyethylene) glycols, poly(oxypropylene) glycols, poly(oxybutylene) glycols, poly(oxy-1,1-dimethylethylene) glycols, poly(tetrahydrofurans), poly(epichlorohydrins), and poly(oxyethylene) glycol adipate. Mixed hydroxyl-terminated polyethers, obtained by treating an initiator containing active hydrogen, such as glycerol, with one alkylene oxide, such as propylene oxide, and then "tipping" the product with a different alkylene oxide, such as ethylene oxide, are also suitable. Other alcohols from which the radical G may be derived include adducts of alkylene oxides either with amines, e.g. N,N-bis(2-hydroxyethyl) aniline and bis(p-(2-hydroxyethylamino)phenyl)methane, or with phenols such as 2,2-bis(p-(2-hydroxyethoxyphenyl)propane.

Accordingly, the radical G preferably has the formula

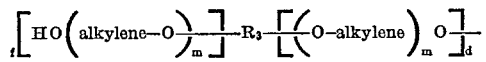

wherein $d$ has the meaning previously assigned, but is not more than 6, $R_3$ represents an aliphatic or aromatic radical containing at least 2 carbon atoms, and having a valency of $(d+f)$, $m$ is an integer of at least 1 and may have different values in each of the $d$ and $f$ chains, $f$ is zero or an integer, such that $(d+f)$ is at most 6, and each alkylene group contains a chain of at least 2 and at most 6 carbon atoms between the indicated oxygen atoms.

Suitably, $R_3$ represents either an aliphatic radical containing at most 10 carbon atoms or an aromatic radical containing at least 1 and at most 3 benzene rings, especially an aliphatic hydrocarbon radical containing at least 3 carbon atoms.

Further preferred are products derived from certain fully etherified alcohol adducts, i.e. those wherein G has the formula

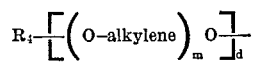

in which

Alkylene, $m$, and $d$ have the meanings previously assigned, and $R_4$ denotes an aliphatic hydrocarbon radical containing at least 2 and preferably from 3 to 6, carbon atoms and having a valency of $d$.

Monohydric or polyhydric phenols from which the radical G may be derived include phenol, the cresols, the xylenols, p-chlorophenol, p-methoxyphenol, resorcinol, hydroquinone, 2,2-bis(4-hydroxyphenyl)propane (otherwise known as bisphenol A), bis(4-hydroxyphenyl)methane, and other phenol-formaldehyde condensation products, and 1,1,2,2-tetrakis(4-hydroxyphenyl)ethane.

Hence, the radical G may be of the following Formulae II, III, or IV, viz

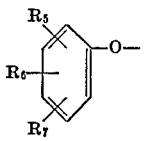
II wherein $R_5$, $R_6$, and $R_7$ each denote a hydrogen or a chlorine atom, or an alkyl or alkoxy group and $d$ is 1, or

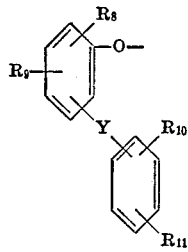
III wherein $R_8$, $R_9$, $R_{10}$, and $R_{11}$ each denote a hydrogen or a chlorine atom, or an alkyl or alkoxy group, Or not more than one of $R_5$, $R_6$, $R_7$, $R_{10}$, and $R_{11}$ may represent a radical of formula —O—, in which case $d$ is 1 or 2, and Y denotes a carbon-carbon bond, —O—, —S—, —SO$_2$—,

or an alkylene hydrocarbon radical containing not more than 4 carbon atoms, or

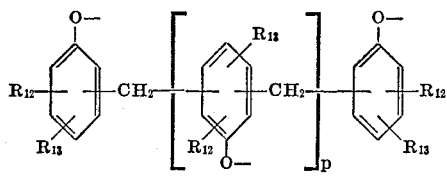
IV wherein $R_{12}$ and $R_{13}$ each denote a hydrogen or a chlorine atom, or an alkyl or alkoxy group, $p$ denotes an integer of at least 1, and $R_1$, $R_2$, and $e$ have the meanings previously assigned, in which case $d$ equals $(p+2)$.

Preferred among the radicals G so derived from phenols are those of the formulae

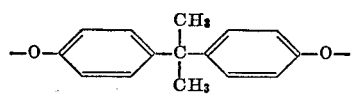

and

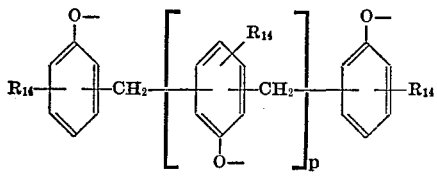

wherein $R_{14}$ denotes hydrogen, chlorine, or a methyl group, and $R_1$, $R_2$, $e$ and $p$ have the meanings previously assigned.

G may also denote the radical formed by removal of $d$ hydrogen atoms from the carboxyl groups of a carboxylic acid containing at least $d'$ or $d''$ carboxylic acid groups, such as the radicals of the formulae

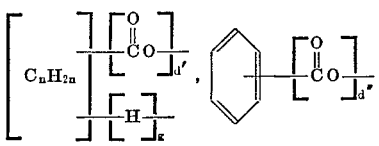

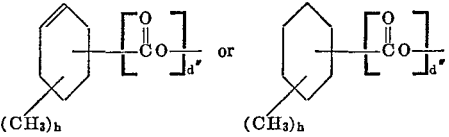

wherein $d'$ is 1 or 2, $d''$ is 1, 2, or 3,
$n$ is a positive integer,
$g$ is 0 or 1, such that $(d'+g)$ is 2, and
$h$ is 0 or 1.

G may be derived from aliphatic, cycloaliphatic, and aromatic acids such as succinic acid, adipic acid, dimerised or trimerised linoleic acid, the mixed, predominantly tertiary aliphatic acids available under the designation "Versatic acid," phthalic, isophthalic, and terephthalic acid, and tetrahydrophthalic, methyltetrahydrophthalic, hexahydrophthalic and methylhexahydrophthalic acids.

Or G may be derived from thiols such as ethyl mercaptan, hexane-1,6-dithiol, 1,3-dimercaptobenzene, 1,4-bis(mercaptomethyl)benzene, and 4,4'-bis(mercaptomethyl)biphenyl; from primary and secondary amines such as aniline, n-butylamine, bis(4-aminophenyl)methane, o- or p-toluidine, and bis(4-aminophenyl)sulphone; from amides, including cyclic amides such as cyanuric acid, ethyleneurea, 1,3-propyleneurea, and hydantoin; and from phosphite esters such as dimethyl, diethyl, and diphenyl phosphite.

In Formula I the residue $R_2$ is joined by one or two of its carbon atoms to the indicated

and —SH groups, and preferably it is a group of formula —C$_r$H$_{2r}$, where $r$ is a positive integer, from 1 to as high as 18 or even 24. Thus,

denotes an acyl radical of a mercaptocarboxylic acid such as mercaptoundecylenic acid or mercaptostearic acid but preferably of thioglycollic, 2-mercaptopropionic, or 3-mercaptopropionic acids, i.e. $R_2$ represents a group of formula —C$_u$H$_{2u}$, where $u$ is 1 or 2.

Preferred are those compounds of the foregoing formulae in which $R_1$ contains a chain of at most 6 carbon between the indicated oxygen atoms, particularly those in which $R_1$ and "alkylene" denote —CH$_2$CH$_2$— or —C$_3$H$_8$—.

Further preferred are polythiols of the above formulae wherein $e$ is zero, while $d$ is at least 2, and suitably is 2 or 3.

Yet further preferred are polythiols of the formula

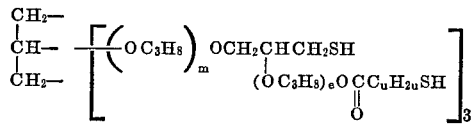

where $m$, $e$ and $u$ have the meanings previously assigned.

Polythiols particularly suitable for use in the curable compositions of the invention are those having an average molecular weight between 400 and 10,000, especially of at least 700 and at most 5,000.

The polythiols may be prepared by treating a compound of formula

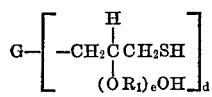
$$\text{V}$$

such that the indicated hydroxyl group is converted into the group —OC(:O)R$_2$SH, where G, $e$, $d$, R$_1$, and R$_2$ have the meanings previously assigned. This conversion is best effected by esterification with a mercaptan-carboxylic acid of formula HOC(:O)R$_2$SH, suitably by heating together in an inert solvent such as toluene or perchloroethylene, in an inert atmosphere such as nitrogen, and in the presence of an acid catalyst such as toluene-p-sulphonic acid, water liberated in the reaction being removed as an azeotrope with the inert solvent.

Less conveniently, polythiols of Formula I may be prepared by treatment of a compound of formula

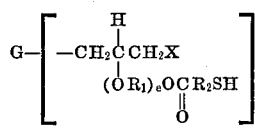
$$\text{VI}$$

where G, R$_1$, R$_2$, $d$, and $e$ have the meanings previously assigned, and X denotes halogen, particularly chlorine, such that the halogen atom (—X) is converted into a mercaptan group (—SH). This conversion may be effected by reaction in a known manner with an alkali metal hydrosulphide, suitably in aqueous solution, see e.g., United Kingdom specifications Nos. 1,076,725 and 1,144,-761, and U.S. Pat. No. 3,258,495.

The intermediates of Formula V, when $e$ is zero, are readily obtainable by reaction of an epihalohydrin such as epichlorohydrin in a known manner with a compound G—(H)$_d$ containing $d$ active hydrogen atoms, such as an alcohol, phenol, or carboxylic acid, to form a chlorohydrin

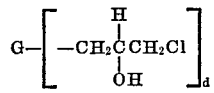
$$\text{VII}$$

followed by treatment with an alkali metal hydrosulphide (see United Kingdom specification No. 1,144,761 and U.S. Pat. No. 3,258,495). Intermediates of Formula V wherein $e$ denotes a positive integer are obtainable by treating the chlorohydrin VII with an alkylene oxide (see United Kingdom specification 1,144,761) and then with an alkali metal hydrosulphide.

The intermediates of Formula V are also readily obtainable by the action of hydrogen sulphide on a glycidyl compound

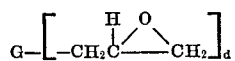

(see United Kingdom specifications 1,031,543 and 1,085,-935).

Intermediates of the type shown in Formula VI can be made from the chlorohydrin of Formula VII by direct esterification, optionally with prior reaction with an alkylene oxide for those compounds of Formula VI in which $e$ denotes a positive integer.

There are also provided curable compositions containing a polythiol of the present invention having on average more than two thiol groups per molecule and an oxidative curing agent.

As oxidative curing agent, lead dioxide or tellurium dioxide are preferred, but zinc oxide, magnesium oxide, organic peroxides, such as benzoyl peroxide and ethyl methyl ketone peroxide, and organic hydroperoxides, such as cumene hydroperoxide and tert. butyl hydroperoxide, may also be used, as well as hot-curing agents such as p-benzoquinonedioxime. The curing agents may be used either in solution or dispersed in a plasticiser for the cured composition, such as dibutyl phthalate or a chlorinated polyphenyl.

These curable compositions may also contain an accelerator for the curing reaction, for example m-dinitrobenzene, sulphur, diphenylguanidine, or tetramethylthiuram disulphide, but especially a tertiary amine such as triethylenediamine, i.e. 1,4 - diazabicyclo[2.2.2]octane, N-benzyldimethylamine, and 2,4,6 - tris(dimethylaminomethyl)phenol, or an alkali-modified clay. If desired, an inhibitor or retardant, suitably a long-chain fatty acid (such as stearic acid or oleic acid) or a metal salt thereof (i.e. a soap, such as aluminium distearate, cadmium stearate or aluminium oleate) may be included to prolong the pot-life. By the use of differing amounts of accelerator, compositions may be prepared having a large range of pot-lives.

To enhance the adhesive properties of the elastomers it is advantageous to incorporate a tackifier or adhesion promoter, such as a liquid or solid resole phenolic resin, an epoxy resin, or a polyvinyl acetate.

The compositions may also contain fillers and thixotropic agents such as finely-divided silica (especially that available under the registered trademark "Aerosil"), carbon black, lithopone, titanium dioxide, barytes, calcium carbonate, calcium silicate, magnesium silicate, and aluminium silicate, and finely divided metals such as aluminium powder. Fillers and other solid additives are advantageously incorporated in the compositions by triple-roll milling or mixing in a Z-blade mixer.

The compositions comprising the novel polythiols and oxidative curing agents may be used as sealants, caulking agents and cable-jointing agents. They are suitably supplied in two packages, one containing the polythiol, and the other oxidative curing agent. Each package may also contain plasticisers, fillers, accelerators, retardants and other additives which do not react on storage with the polythiol, or with the curing agent, as appropriate. Immediately prior to use, the two formulations are mixed thoroughly and allowed to cure, with the application of heat if desired.

The invention further provides curable compositions comprising a thiol of the present invention and an epoxy resin (i.e. a compound or mixture of compounds having on average more than one 1,2-epoxide group per molecule).

Epoxy resins which may be used in these compositions include polyglycidyl ethers of polyhydric alcohols or polyhydric phenols such as those alcohols and phenols listed above as suitable for constituting, after removal of one or more active hydrogen atoms, the radical G; also polyglycidyl esters of polycarboxylic acids such as those likewise listed above as suitable for constituting, after removal of one or more active hydrogen atoms, the radical G.

The preferred epoxy resins are polyglycidyl ethers of 2,2-bis(4-hydroxyphenyl)propane or of phenol-formaldehyde novolacs, containing at least one 1,2-epoxide group equivalent per kilogram.

Usually, sufficient of the novel thiol compound is used to provide 0.75 to 1.25 thiol group equivalents per 1,2-epoxide group of the epoxy resin. The reaction between the mercaptan groups and 1,2-epoxide groups may be accelerated by a catalyst. Typical catalysts are alkali metal hydroxides, boron trifluoride complexes, and aluminium, zinc and lead octoates and naphthenates, but the preferred catalysts are tertiary amines such as 2,4,6-tris(dimethylaminomethyl)phenol, triethanolamine, or N-benzyldimethylamine.

The curable compositions may contain other curing agents for the epoxy resin, in which case the thiol will act as a flexibiliser in addition to taking part in the curing reaction.

As curing agents there may be mentioned those conventionally employed for cross-linking or polymerising epoxy resins, for example aliphatic, cycloaliphatic, and aromatic amines such as n-butylamine, p-phenylenediamine, bis(p-aminophenyl)methane, ethylenediamine, N,N-diethylethylenediamine, diethylenetriamine, triethylenetetramine, tetraethylenepentamine, 2,2,4-trimethylhexane-1,6 - diamine, 2,3,3 - trimethylhexane - 1,6 - diamine, bis-(4 - aminocyclohexyl)methane, 2,2 - bis(4 - aminocyclohexyl)propane, 3 - aminomethyl - 3,5,5 - trimethylcyclohexylamine, dicyandiamide, anilineformaldehyde resins, polyaminoamides, e.g. those prepared from aliphatic polyamides and dimerised or trimerised unsaturated fatty acids; isocyanates and isothiocyanates; polyhydric phenols, e.g. resorcinol, hydroquinone, 2,2-bis(4 - hydroxyphenyl)-propane, phenol-aldehyde resins and oil-modified phenol-aldehyde resins; reaction products of aluminum alkoxides or phenolates with tautomeric-reacting compounds of the acetoacetic ester type; Friedel-Crafts catalysts, e.g. AlCl₃, SnCl₄, ZnCl₂, BF₃, and their complexes with organic compounds; phosphoric acid; and polycarboxylic acids and their anhydrides e.g. phthalic anhydride, methylendomethylene-tetrahydrophthalic anhydride, dodecenylsuccinic anhydride, hexahydrophthalic anhydride, hexachloroendomethylenetetrahydrophthalic anhydrides or endomethylenetetrahydrophthalic anhydride, or their mixtures or maleic or succinic anhydrides.

The compositions comprising epoxy resin and thiol-containing polyether may contain reactive diluents such as phenyl glycidyl ether, allyl glycidyl ether, glycidyl methacrylate, glycidyl acrylate, isooctyl glycidyl ether, or n-butyl glycidyl ether. They may also contain fillers, other plasticisers, and colouring agents, for example asphalt, bitumen, glass fibres, mica, quartz powder, cellulose, kaolin, finely-divided silica such as "Aerosil," or metal powders. These compositions may be used as flexibilised dipping, casting, potting, encapsulating, coating, or adhesive resins. They are especially valuable for the production of flexible products used in caulking, cable-jointing and civil engineering applications.

The following examples illustrate the invention. Unless otherwise indicated parts denotes parts by weight.

EXAMPLE I

Polythiol A

Barium hydroxide octahydrate (31.6 g.) water (30 ml.) and ethanol (120 ml.) were stirred together at 0° C. and hydrogen sulphide was passed in with vigorous stirring until the mixture was saturated. Purified bisphenol A diglycidyl ether (34 g.) was dissolved in warm ethanol (10 ml.) and added dropwise at 0° C. over three hours. During this period, hydrogen sulphide was passed slowly through the mixture to keep it saturated. After a further hour, the flow of hydrogen sulphide was stopped and the mixture was allowed to stand at room temperature for two hours. Carbon dioxide was then passed in with vigorous stirring to convert the barium hydrosulphide into the carbonate, which was filtered off and washed thoroughly with ethanol (3×50 ml.). The combined filtrate and washings were stripped at 50° C. under reduced pressure, and there remained a crystalline solid having a thiol value of 4.84 equiv./kg.

A mixture of this intermediate (20.4 g.), thioglycollic acid (11 g.), perchloroethylene (100 ml.) and toluene-p-sulphonic acid (0.5 g.) was heated at reflux under nitrogen in such a manner as to entrain water formed during reaction. The mixture was washed with water and the solvent removed to yield the corresponding mercapto ester having a thiol value of 5.15 equiv./kg.

The product (Polythiol A) is considered to be substantially of the formula

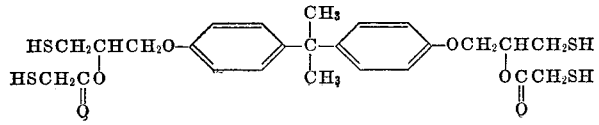

Polythiol B

The hydroxymercaptan employed had the structure

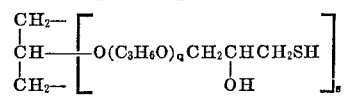

where $q$ is approximately 20 to 25 and $s$ has an average value between 2 and 3: it has an average molecular weight of about 5000 and its thiol content was 0.32 equiv./kg.

A mixture of this hydroxymercaptan (529 g., 0.169 thiol-equiv.), thioglycollic acid (19.5 g., 0.212 equiv.), toluene-p-sulphonic acid (1 g.) and perchloroethylene (350 ml.) was heated to reflux with stirring in nitrogen for 8 hours. Water (4 ml.) formed during the reaction was removed as its azeotrope. The mixture was stirred with a slurry of sodium bicarbonate (5 g.) in water (2.5 ml.) for 2 hours, and then filtered. Concentration of the filtrate in vacuo yielded a residue weighting 532 g. (Polythio B) which had a thiol value of 0.58 equiv./kg.

Polythiol C

The hydroxymercaptan employed was similar to that used to prepare Polythiol B, except that its average molecular weight was about 800 and its thiol content was about 3.7 equiv./kg.

A mixture of this hydroxymercaptan (500 g.), thioglycollic acid (218 g.), toluene-p-sulphonic acid (1.5 g.) and perchloroethylene (500 ml.) was heated to reflux with stirring for 8 hours in nitrogen. Water (44 ml.) formed during the reaction was removed as its azeotrope. The mixture was washed with water until the washings had pH 5–6, then the solvent was removed by distillation in vacuo. The residue (Polythiol C) (640 g.) had a thiol value of 5.7 equiv./kg; its nuclear magnetic resonance spectrum showed two distinct triplets corresponding to the two types of thiol present, i.e.

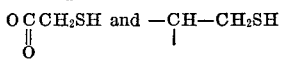

Polythiol D

The hydroxymercaptan employed had a thiol value of 1.4 equiv./kg., and was prepared by reaction of a glycerolpropylene oxide adduct with epichlorohydrin, more propylene oxide, and then sodium hydrosulphide, (compare United Kingdom specification 1,144,761).

A mixture of this hydroxymercaptan (500 g.), thioglycollic acid (89 g.), toluene-p-sulphonic acid (4 g.) and perchloroethylene (500 ml.) was heated to reflux with stirring for 8 hours in nitrogen. The water formed during the reaction was 23 ml. The mixture was worked up as described in the preparation of Polythiol C. The residue (Polythiol D) (500 g.) had a thiol value of 1.78 equiv./kg.

Polythiol E

The hydroxymercaptan employed was similar to that used to prepare Polythiol D, except that its thiol value was 0.54 equiv./kg.

A mixture of this hydroxymercaptan (500 g.), thioglycollic acid (364 g.), toluene-p-sulphonic acid (4 g.) and perchloroethylene (500 ml.) was heated and the product isolated as before. Water formed during the reaction measured 10 ml. The residue (Polythiol E) (500 g.) had a thiol value of 0.75 equiv./kg.

EXAMPLE II

Polythiol B (30 g.), finely divided calcium carbonate (28 g.) (Calofort U, available from John and E. Sturge Ltd.), titanium dioxide (2 g.) and benzyldimethylamine (0.5 g.) were intimately mixed. The pasty product was mixed with lead dioxide paste (4.2 g.) comprising lead dioxide (50 parts), butyl phthalate (50 parts), and "Aerosil" (1 part). It cured to a tack-free state in 2 hours at room temperature and was converted into a hard tough rubber when left at room temperature overnight.

Polythiol E (30 g.), finely divided calcium carbonate (28 g.), and titanium dioxide (2 g.) were intimately mixed, and then blended with lead dioxide paste (5.25 g.) to give a composition which cured to a hard tough rubber when left at room temperature overnight.

EXAMPLE III

An epoxide resin (1 part), (hereinafter referred to as Epoxy resin I) which was liquid at room temperature and contained 5.2 epoxide equiv./kg., prepared in a conventional manner from bisphenol A and epichlorohydrin, Polythiol A (1 part) and N-benzylidimethylamine (0.1 part), on mixing at room temperature, cured within 30 minutes to a hard, tough material.

On mixing at room temperature 11.4 parts of Epoxy resin I, 10.4 parts of Polythiol C, and 1 part of N-benzyldimethylamine, an exothermic reaction occurred and the mixture hardened within one hour to form a tough, impact-resistant casting.

A mixture of Epoxy resin I (3.5 parts), Polythiol D (10.4 parts) and N-benzyldimethylamine (0.8 part) and cured on mixing at room temperature to form within 16 hours a tough, flexible casting.

EXAMPLE IV

A mixture of Epoxy resin I (10.0 parts), Polythiol D (14.8 parts) and triethylenetetramine (0.9 part), on curing at room temperature for 12 hours, yielded a tough, flexible casting.

We claim:

1. The polythiol of formula

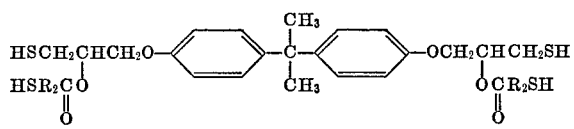

wherein $R_2$ represents a group of formula $-C_uH_{2u}-$ where $u$ is an integer of at least 1 and at most 2.

2. The polythiol of formula

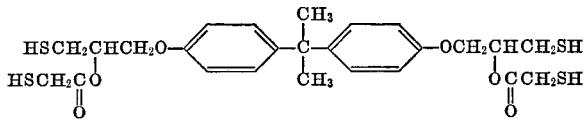

References Cited

UNITED STATES PATENTS 3,465,057    9/1969    Cameron _____ 260—830

LORRAINE A. WEINBERGER, Primary Examiner

J. F. TERAPANE, Assistant Examiner

U.S. Cl. X.R.

260—47 EP, 79